United States Patent [19]

Zeiringer

[11] Patent Number: 5,147,831

[45] Date of Patent: Sep. 15, 1992

[54] METHOD FOR PRODUCING A FINE GRAINED POWDER CONSISTING OF NITRIDES AND CARBONITRIDES OF TITANIUM

[75] Inventor: Hans Zeiringer, Carinthia, Austria

[73] Assignee: Treibacher Chemische Werke Aktiengesellschaft, Treibach, Austria

[21] Appl. No.: 661,866

[22] Filed: Feb. 27, 1991

[30] Foreign Application Priority Data

Mar. 14, 1990 [AT] Austria ................................. 607/90

[51] Int. Cl.⁵ ............................................. C04B 35/58
[52] U.S. Cl. ...................................... 501/96; 423/409; 423/411
[58] Field of Search ................. 423/409, 411, 382; 501/96

[56] References Cited

U.S. PATENT DOCUMENTS

| | | | |
|---|---|---|---|
| 957,842 | 5/1910 | Bosch | 423/411 |
| 4,784,839 | 11/1988 | Bachelard et al. | 423/409 |

FOREIGN PATENT DOCUMENTS

| | | | |
|---|---|---|---|
| 0213606 | 12/1983 | Japan | 423/411 |
| 1-096005 | 4/1989 | Japan | 423/411 |

OTHER PUBLICATIONS

"Preparation of Titanium Nitride" Kleespies et al. (1964), U.S. Dept of the Interior-Bureau of Mines, pp. 1-7.

Primary Examiner—William R. Dixon, Jr.
Assistant Examiner—Paul Marcantoni
Attorney, Agent, or Firm—Collard & Roe

[57] ABSTRACT

The invention relates to a method for producing fine grained, sintering active nitride and/or carbonitride powder of titanium as well as, optionally, of other metals of the IVA, VA and VIA group of the periodic table of elements. In order to achieve, without any considerable comminution, a grain of high purity with a low grain size, the following steps are performed:

The introduction into the reactor of a reaction mixture consisting of oxides of titanium and, optionally, of other metals of the IVA, VA and VIA group of the periodic system and a carbonaceous material;

providing a nitrogen atmosphere in the reactor at a decreased pressure;

heating the content of the reactor to a temperature of between 800° C. and 2000° C., preferably between 1000° C. and 1900° C., and keeping the temperature within a range of between 1400° C. and 1800° C. with simultaneous carrying-off of the gaseous reaction products, whereby nitrogen or a gas which delivers nitrogen is directed through or over the reaction mixture;

cooling the content of the reactor.

12 Claims, No Drawings it must be safeguarded that the reaction products such as CO and the like are quickly carried off.

When actually performing the process, the reaction vessel filled with the oxide and carbon mixture is inserted into a tank which can be evacuated and which is provided with a heating, whereupon said tank is evacuated for removing the oxygen and subsequently flooded with nitrogen for several times. After reaching a vacuum of <1 mbar, the heating up Process is commenced. Following a temperature of approx. 800°-1000° C. the reduction of the oxide begins. At the same time the admission of nitrogen is started. The near complete reduction of the oxides and the formation of nitrides or carbonitrides allows a longer dwell time at approx. 1600° C. under the flowing nitrogen. In order to lower the oxygen content in the product to a value of <0.5%, it is necessary to increase the temperature to approx. 1800° C., whereby the dwell time at said temperature should be kept as short as possible, i.e. within a period of 1-2 hours. The product gained after its cooling off contained a grain size of <2 μm on the average. The oxygen content was within a magnitude of 0.05-0.2 percent. The required subsequent slight comminution was only necessary for removing agglomerates. The materials produced in accordance with the method of the invention are particularly characterized by their high purity, good compressibility and sinterability at low sintering temperatures. This is due to their low oxygen content, low grain size and spherical grain shape.

Preferably, the method is performed in such a manner that during the heating up period and maintaining the temperature the reactor is evacuated, whereby the overall pressure does not exceed 100 mbar, preferably 10 mbar. Thus the partial pressure of the reaction gases to be carried off may be kept very low.

It has shown to be particularly preferable if during the heating up period and the period during which the temperature is maintained a flow of nitrogen is continuously directed over or through the reaction mixture, said flow being between 0.2 and 5 l per minute and per kg of the reaction mixture and preferably between 0.5 and 2 l per minute and per kg of the reaction mixture.

The method in accordance with the invention is now explained in greater detail by way of example, whereby said examples are not to be regarded as limiting:

EXAMPLE 1 (COMPARISON)

872 g titanium oxide and 329.3 g flame soot were well mixed in a plough blade positive mixer. The mixture was stamped in a graphite reactor without a diaphragm floor. After smoothing the surface of the solidly stamped mixture, bores were made into said mixture by means of a steel pin through a template. The reaction vessel plus content was then placed in a resistance furnace, said furnace being mounted within a vacuum tank. After closing the vacuum tank, its content was carefully evacuated to a pressure of <1 mbar and subsequently flooded twice with nitrogen. At a pressure of approx. 1-10 mbar of the nitrogen the heating up of the reaction mixture was started. The speed of the heating up process was 10-20° C./min. Above a temperature of 800° C.-1000° C. a slow increase in the pressure indicated the commencing reduction of the oxide. From this period of time the evacuation of the reaction gases was started and this was performed only to the extent that a tank pressure of 300 mbar was not exceeded. Starting with a temperature of approx. 1500 ° C.-1600 ° C., the reaction decreased and the tank was filled with nitrogen to approx. 400-500 mbar and the temperature was kept for about 5 hours at 1600° C. and the nitrogen pressure was maintained at around 500 mbar. Subsequently, the temperature was increased in one case to 1800° C. and in the other case to 1950° C. The heating-up speed was in both cases approx. 20° C./min. The dwell time at the final temperature was fixed at 1.5 hours. The pressure in the tank was constantly kept at 500 mbar. After the contents of the crucible had cooled off, the two experiments yielded products with the following chemical and physical properties:

|  | Final temp. 1800° C. | Final temp. 1950° C. |
| --- | --- | --- |
| Yield | 664.5 g | 655.3 g |
| % C total | 10.79 | 11.04 |
| % C free | 0.05 | 0.05 |
| % N | 9.3 | 9.0 |
| % O | 1.16 | 0.34 |
| average grain size in μm | 2.89 | 6.0 |

In order bring the materials gained from the two trials to an average grain size of <2 μm, the 1800° C. sample was ground for one hour in a laboratory triturator with a filling of hard metal balls under anhydric light petrol. The products gained after removing the comminution liquid in the vacuum dryer comprised the following composition and average grain size:

|  | Final temp. 1800° C. | Final temp. 1950° C. |
| --- | --- | --- |
| % C total | 10.5 | 11.0 |
| % C free | 0.05 | 0.05 |
| % N | 9.1 | 8.9 |
| % O | 1.2 | 0.74 |
| % W | 0.78 | 1.38 |
| % Fe | 0.04 | 0.1 |
| average grain size in μm | 1.95 | 2.0 |

As can be seen in the composition of the two products, they were considerably soiled by attrition of the milling vessel and balls. Furthermore, the oxygen content rose to an undesirable level.

EXAMPLE 2

Like in example 1, 872 g titanium oxide and 329.3 g flame soot were well mixed and the mixture was stamped into a reactor with a diaphragm made from graphite. After applying a number of gas channels by means of a steel pin, the crucible was placed gastight onto the admission chamber mounted within a resistance furnace. Subsequently, the tank lid was closed and the interior of the tank was evacuated for removing the oxygen, whereby it was flooded twice with nitrogen in between. At a tank pressure of 1-10 mbar the heating-up process was started like in example 1. Above a temperature of 800°-1000° C. the slow increase in the pressure pointed out to the beginning reaction. From this time onwards the full evacuation of the reaction gases was started, whereas simultaneously a flow of nitrogen of 1 l/min was directed through the mixture. The overall pressure in the tank at some points reached values of up to 10 mbar. On the average the value was between 1 and 2 mbar. As soon as the temperature reached 1600° C. it was kept there for 5 hours. Subsequently the temperature was increased, like in example 1, to 1800° C. and was kept there for 1.5 hours. The product gained 5,147,831

METHOD FOR PRODUCING A FINE GRAINED POWDER CONSISTING OF NITRIDES AND CARBONITRIDES OF TITANIUM

BACKGROUND OF THE INVENTION

1. Field of the Invention

The invention relates to a method for producing fine grained, sintering active nitride and/or carbonitride powder of titanium as well as, optionally, of other metals of the IVA, VA and VIA group of the periodic table of elements.

Cutting materials on the basis of tungsten carbide with or without additives of carbides of the elements of the IVA, VA and VIA group of the periodic system have long been known as hard metals and have found a wide field of application.

In the last few years a new group of cutting materials has been developed which is known under the name of "Cermets". Such metal-ceramic materials essentially consist of a metallic binder phase and a ceramic hard solid component such as nitride, carbide or carbonitride of titanium, optionally with additives of carbides, nitrides or carbonitrides of further elements of the IVA, VA and VIA group of the periodic system. The metallic binder phase is usually nickel. The optimization of the properties for the various fields of application is to be achieved by altering the proportion of binder phase, the size of the hard solid particles, the ratio between carbon and nitrogen, and by addition of other hard solids of the above-mentioned groups of the periodic system. Cermet cutting materials are generally characterized by a tuned relationship between abrasive resistance and tenacity. Compared with common hard metals, said cermets provide improved abrasive properties and a lower tendency of diffusion. Said cermets are particularly suitable for working ductile materials at high cutting speeds with low cutting depths in order to achieve the highest surface qualities in the shortest possible time. The hard solid components contained in the cermets, in particular the nitride and/or carbonitride of titanium, should be as fine-grained and as pure as possible. The content in oxygen is a special criterion as it influences the wetting behaviour with regard to the binder phase. In many cases it might be desirable to homogenously build additives of further carbides, nitrides or carbonitrides of the elements of the IVA, VA and VIA group of the periodic system into the titanium carbonitride mixed crystal.

2. Description of Prior Art

Literature provides a number of methods for manufacturing titanium nitride or titanium carbonitride with or without further additives.

Presently, titanium carbonitride with optional further additives is mainly manufactured by reaction annealing of a mixture consisting of titanium carbide and, optionally, additives of further carbides and titanium nitride, said annealing taking place under nitrogen at temperatures of around 1500° C. A further possibility for the specific production of nitrides consists of transforming the respective metal powder by means of nitrogen, whereby carbon may also be added. In accordance with the reaction of titanium oxide with carbon and nitrogen, which was examined by E. Friederich and L. Sittig in 1925, one also receives titanium nitride with a more or less high content of carbon. When a reaction temperature of approx. 1250° C. is applied, one gains a bluish product which points out to a high content of oxygen. To achieve a low content of oxygen in the product, it is necessary, as is well known, to apply temperatures of around 2000° C. The low-oxygen nitride or carbonitride comprises grain sizes which require the product to be finely comminuted in ball mills, triturators etc. at high costs. During the process, undesirable impurities enter the material to be ground. In many cases it is near impossible to reach the grain size of <2 μm which is used in the application. By transforming titanium tetrachloride with nitrogen and hydrogen or ammonia one receives extremely fine-grained titanium nitride. The high costs and the product's unstableness in the air as a consequence of the low grain size are the disadvantages of this method.

SUMMARY OF THE INVENTION

It is the object of the present invention to avoid such disadvantages and to develop a method which results in a nitride or carbonitride by applying titanium oxide or, optionally, a mixture of oxides by reduction with carbon in the presence of nitrogen or a gas which delivers nitrogen, said nitride or carbonitride, without any major subsequent comminution, being present with a sufficiently small grain size within a magnitude of <2 μm and high purity, thus being exceptionally suitable for the production of cermets.

Surprisingly this task was solved in accordance with the invention in that the method comprises the following steps:

The introduction into the reactor of a reaction mixture consisting of oxides of titanium and, optionally, of other metals of the IVA, VA and VIA group of the periodic system, and a carbonaceous material;

providing a nitrogen atmosphere in the reactor at a decreased pressure;

heating the content of the reactor to a temperature of between 800° C. and 2000° C., preferably between 1000° C. and 1900° C., and keeping the temperature within a range of between 1400° C. and 1800° C. with simultaneous carrying-off of the gaseous reaction products, whereby nitrogen or a gas which delivers nitrogen is directed through or over the reaction mixture;

cooling the content of the reactor.

DETAILED DESCRIPTION

The perforated diaphragm on floor of the reaction vessel and the admission chamber which is located below the furnace chamber and sealed off gastight with regard to said chamber are to provide the flow of the nitrogen through the mixture during the annealing treatment, whereby the furnace chamber located above is to preferably be provided with the best possible rough or fine vacuum within a magnitude of between approx. 1–40 mbar. The flow of the nitrogen through the mixture is decisive for the success of the method in accordance with the invention. Said flow of nitrogen may be extensively varied by the admission pressure or by the pressure difference with regard to the evacuated furnace chamber. In order to achieve a successful performance of the method, the flow of nitrogen should be set within a magnitude of 0.1–5 $cm^3/m^2$ per hour with regard to the specific surface of the reaction mixture which changes during the reaction. Depending on the type of reactor used, the flow of nitrogen may be directed either through the mixture or over it in the event that said mixture is provided in thin layers. In any case after the mixture had cooled off contained the following chemical and physical properties:

| | |
|---|---|
| Yield: | 645.8 g |
| % C total | 10.46 |
| % C free | 0.05 |
| % N | 10.7 |
| % O | 0.06 |
| average grain size in μm | 1.7 |

For removing the agglomerates, the material gained in accordance with example 2 was ground for 30 minutes in a laboratory triturator with a filling of hard metal balls under anhydric petrol. The product gained after removing the comminution liquid in the vacuum dryer showed the following quality characteristics:

| | |
|---|---|
| % C total | 10.5 |
| % C free | 0.05 |
| % N | 10.5 |
| % O | 0.18 |
| % W | 0.21 |
| % Fe | 0.01 |
| average grain size in μm | 1.55 |

Due to the low oxygen content and the low grain size the product in accordance with the invention is exceptionally suitable for the production of cermets.

EXAMPLE 3

Like in example 1, 891.9 g $TiO_2$ and 301.8 g flame soot were thoroughly mixed and the mixture was subsequently pressed into tablets at a pressure of 5 t/cm². Said tablets were then stacked in a reaction vessel made from graphite and comprising a diaphragm. The treatment took place in accordance with that of example 2. The product gained after 30 minutes of deagglomeration in the triturator showed the following ratings:

| | |
|---|---|
| % C total | 6.03 |
| % C free | 0.05 |
| % N | 16.5 |
| % O | 0.15 |
| % W | 0.25 |
| % Fe | 0.01 |
| average grain size in μm | 1.95 |

EXAMPLE 4

800 g titanium oxide, 87.4 g tantalum oxide and 89.7 g tungsten oxide were thoroughly mixed, like in example 1, with 336 g flame soot and pressed into tablets at a pressure of 5 t/cm². The further treatment took place in accordance with that of examples 2 and 3. After deagglomeration in the triturator the product comprised the following chemical and physical properties:

| | |
|---|---|
| % C total | 9.2 |
| % C free | 0.05 |
| % N | 9.2 |
| % O | 0.20 |
| % W | 9.4 |
| % Ta | 9.4 |
| % Fe | 0.01 |
| average grain size in μm | 1.75 |

In accordance with the results of examples 2-4 the inventive method allows the production of carbonitrides of titanium with optional additives of elements of the IVA, VA and VIA group, whereby said carbonitrides are exceptionally suitable for the production of cermets due to their grain size and their content of impurities.

I claim:

1. A method for producing a fine-grained powder consisting essentially of nitrides and carbonitrides of titanium, which comprises the steps of
   (a) introducing a reaction mixture essentially consisting of oxides of titanium and a carbonaceous material into a reactor,
   (b) maintaining a nitrogen atmosphere in the reactor at a subatmospheric pressure,
   (c) heating the reaction mixture n the reactor to a temperature between 800° C. and 2000° C. to evolve gaseous reaction products,
   (d) keeping the temperature within a range of between 1400° C. and 1800° C. while simultaneously removing the gaseous reaction products and contacting the reaction mixture with nitrogen or a nitrogen-evolving gas to obtain a solid reaction product, and
   (e) cooling the solid reaction product.

2. The method of claim 1, wherein the reaction mixture additionally contains oxides of other metals in the IVA, VA and VIA groups of the periodic table of elements.

3. The method of claim 1, wherein the reaction mixture is heated to a temperature between 1000° C. and 1900° C.

4. The method of claim 1, wherein the reactor is evacuated during steps (c) and (d) to hold the pressure to a maximum of 100 mbar.

5. The method of claim 4, wherein the pressure is held to a maximum of 10 mbar.

6. The method of claim 1, wherein a flow of 0.2 to 5 l of nitrogen per minute and per kg of the reaction mixture is continuously directed through the reaction mixture during steps (c) and (d).

7. The method of claim 6, wherein a flow of 0.5 to 2 l of nitrogen per minute and per kg of the reaction mixture is continuously directed over the reaction mixture during steps (c) and (d).

8. The method of claim 1, wherein a flow of 0.2 to 5 l of nitrogen per minute and per kg of the reaction mixture is continuously directed over the reaction mixture during steps (c) and (d).

9. The method of claim 8, wherein a flow of 0.5 to 2 l of nitrogen per minute and per kg of the reaction mixture is continuously directed through the reaction mixture during steps (c) and (d).

10. The method of claim 1, wherein the temperature is varied within said range during step (d).

11. The method of claim 1, wherein the reaction mixture introduced into the reaction has the form of pellets or briquets.

12. The method of claim 1, wherein the reaction mixture is compacted in the reactor and a plurality of channels are provided in the compacted reaction mixture.

* * * * *